United States Patent
Danner, Jr. et al.

(10) Patent No.: US 11,505,341 B1
(45) Date of Patent: Nov. 22, 2022

(54) ROBOTIC CASE PACKER PLATFORM AND PACKING METHOD

(71) Applicant: Douglas Machine Inc., Alexandria, MN (US)

(72) Inventors: Robert Allan Danner, Jr., Alexandria, MN (US); Christopher Todd Davis, Alexandria, MN (US); Aaron M. Frederick, Alexandria, MN (US); Richard W. Lukanen, Jr., Alexandria, MN (US); David L. Anderson, Alexandria, MN (US)

(73) Assignee: Douglas Machine Inc., Alexandria, MN (US)

( * ) Notice: Subject to any disclaimer, the term of this patent is extended or adjusted under 35 U.S.C. 154(b) by 261 days.

(21) Appl. No.: 16/593,288

(22) Filed: Oct. 4, 2019

Related U.S. Application Data

(60) Provisional application No. 62/741,687, filed on Oct. 5, 2018.

(51) Int. Cl.
| | |
|---|---|
| *B65B 5/02* | (2006.01) |
| *B65B 5/10* | (2006.01) |
| *B65B 7/20* | (2006.01) |

(52) U.S. Cl.
CPC ............. *B65B 5/024* (2013.01); *B65B 5/106* (2013.01); *B65B 7/20* (2013.01)

(58) Field of Classification Search
CPC ......... B65B 5/024; B65B 5/026; B65B 5/028; B65B 5/105; B65B 5/106; B65B 43/165;
(Continued)

(56) References Cited

U.S. PATENT DOCUMENTS

| | | | | |
|---|---|---|---|---|
| 3,057,267 A | * | 10/1962 | Johnson, Jr. .......... | B65B 43/345 |
| | | | | 493/309 |
| 3,269,091 A | * | 8/1966 | Martin ................... | B65B 63/022 |
| | | | | 53/526 |

(Continued)

FOREIGN PATENT DOCUMENTS

| | | | | |
|---|---|---|---|---|
| EP | 2865602 A1 | * | 4/2015 | ........... B65B 59/005 |
| WO | 2017041007 A1 | | 3/2017 | |

OTHER PUBLICATIONS

Ixapack Global, Complete Line for Doypack YouTube video posted May 9, 2017, https://www.youtube.com/watch?v=fIF5BGpp-Bs &feature=youtu.be accessed Feb. 7, 2020.

*Primary Examiner* — Joshua G Kotis
(74) *Attorney, Agent, or Firm* — Dicke, Billig & Czaja, PLLC

(57) ABSTRACT

A robotic case packer is provided. The packer includes a case conveying apparatus, a case set up station, a case loading station, downstream of the case set up station, and a loaded case closure station, downstream of the case loading station, the case conveying apparatus receiving and conveying a case blank for case set up, case loading and loaded case closure operations, a process flow path as to case operations delimited by the case conveying apparatus. The case set up station, characterized by a case set up robot operable in a process flow path direction, secures a case blank from a source of case blanks and transfers the blank to the case conveying apparatus. The case loading station, characterized by a case loading robot operable across the process flow path direction, transfers an article group for case loading into a set up case conveyed by the case conveying apparatus. The case closure station, characterized by a loaded case closure robot operable in the process flow path direction, effectuates a compressed sealed closure of a loaded case conveyed by the case conveying apparatus.

28 Claims, 12 Drawing Sheets

(58) Field of Classification Search
CPC ... B65B 43/265; B65B 43/285; B65B 43/305; B65B 43/325; B65B 43/345; B65B 43/52; B65B 43/56; B65B 7/20; G05B 2219/45048
USPC .......................... 53/377.8, 378.3, 566, 167
See application file for complete search history.

(56) References Cited

U.S. PATENT DOCUMENTS

| | | | |
|---|---|---|---|
| 3,339,337 A * | 9/1967 | Rapp | B65B 9/06 53/550 |
| 3,753,837 A * | 8/1973 | Lense | B65B 7/164 53/377.2 |
| 3,888,360 A | 6/1975 | Ando et al. | |
| 3,994,490 A | 11/1976 | Smiltneek | |
| 4,079,577 A | 3/1978 | Ulrich et al. | |
| 4,262,469 A | 4/1981 | Ooms et al. | |
| 4,524,560 A | 6/1985 | Soodman | |
| 4,807,428 A * | 2/1989 | Boisseau | B65B 7/20 53/247 |
| 5,060,455 A | 10/1991 | Schmeisser | |
| 5,303,531 A | 4/1994 | Senaratne | |
| 5,642,603 A | 7/1997 | Tanaka | |
| 5,765,337 A | 6/1998 | Lodewegen et al. | |
| 5,809,746 A | 9/1998 | DePuy | |
| 6,006,493 A | 12/1999 | Focke et al. | |
| 6,209,293 B1 | 4/2001 | Powers | |
| 6,652,217 B2 | 11/2003 | Dettman et al. | |
| 6,859,683 B2 | 2/2005 | Parker et al. | |
| 7,409,812 B2 | 8/2008 | Gilmore et al. | |
| 7,886,503 B2 | 2/2011 | Chase et al. | |
| 7,941,990 B2 | 5/2011 | Aquarius | |
| 8,387,349 B2 | 3/2013 | Bellante | |
| 8,671,651 B2 | 3/2014 | Poutot | |
| 9,696,221 B2 | 7/2017 | Lauzier et al. | |
| 10,549,924 B2 | 2/2020 | Zhang et al. | |
| 10,631,941 B2 * | 4/2020 | Hashimoto | B23Q 15/12 |
| 11,292,624 B1 * | 4/2022 | Frederick | B65B 7/20 |
| 2005/0126123 A1 | 6/2005 | Chase et al. | |
| 2007/0204567 A1 | 9/2007 | Wintring et al. | |
| 2009/0205929 A1 * | 8/2009 | DeGuglielmo | B65B 5/024 198/347.1 |
| 2011/0131925 A1 | 6/2011 | Chase et al. | |
| 2011/0154784 A1 * | 6/2011 | Poutot | B65B 5/024 53/443 |
| 2011/0173930 A1 * | 7/2011 | Poutot | B65B 21/20 53/473 |
| 2011/0283668 A1 * | 11/2011 | Bellante | B65B 5/105 53/376.5 |
| 2012/0096808 A1 | 4/2012 | Poutot et al. | |
| 2013/0040795 A1 * | 2/2013 | Murano | B31B 50/00 493/53 |
| 2014/0102044 A1 | 4/2014 | Berglin et al. | |
| 2014/0135196 A1 | 5/2014 | Berglin et al. | |
| 2015/0375880 A1 * | 12/2015 | Ford | B65B 43/52 53/443 |
| 2017/0348939 A1 * | 12/2017 | Langen | B65B 43/305 |
| 2018/0086019 A1 | 3/2018 | Langen | |
| 2018/0244410 A1 * | 8/2018 | Peterman | B65B 35/36 |
| 2018/0265234 A1 * | 9/2018 | Sassi | B65B 5/06 |
| 2019/0084701 A1 * | 3/2019 | Sassi | B65B 43/52 |
| 2019/0084709 A1 * | 3/2019 | Sassi | B65H 3/0883 |

* cited by examiner

ROBOTIC CASE PACKER PLATFORM AND PACKING METHOD

This is a U.S. utility patent application filed under 35 USC § 111(a) claiming priority under 35 USC § 120 of/to U.S. patent application Ser. No. 62/741,687 filed Oct. 5, 2018 and entitled ROBOTIC CASE PACKER PLATFORM, incorporated by reference herein/by in its entirety.

TECHNICAL FIELD

The present invention is generally directed to automated case packing operations and one or more of processing lines, systems, machines, apparatuses, assemblies, subassemblies, for/of any or all of case set up, case packing and/or loaded case closure, more particularly, to systems characterized by robotic case set up, robotic case packing and/or robotic loaded case closure operations.

BACKGROUND

Automated robotic case packing operations are characterized by case set up (i.e., at least partially erecting a case from a case blank sourced from a source of case blanks such as a magazine or pallet of case blanks or the like), case filing/loading (i.e., introducing articles/product into the partially erect case), and case closure (i.e., securingly housing/containing the product within or in relation to the case to create a package). Cases may generally comprise trays, wrap around, or knock down styles with case loading operations comprising top load, horizontal load or bottom load, the nature of the case style and filing operation being a function of, among other things, the nature of the product.

Numerous teachings directed to robotic case packing are known with a considerable number of intermittent motion case packers commercially available. For example, Boisseau (U.S. Pat. Nos. 4,870,428), Focke et al. (6,006,493), Bellante (8,387,349), Poutot (8,671,651), and Wintring et al. (US Pat. Appl. 2007/0204567) generally disclose machines for case set up, case loading and case closure operations, however, each generally emphasize a single aspect (i.e., operation) of the overall packer functionality.

Boisseau discloses a readily adjustable packing machine, capable of top or side case loading operations, characterized by a robust mechanical case erecting station. After transfer of a blank to sets of drive lugs via a pivot arm (FIG. 5 phantom), a pivotable set up arm 28, carried on shaft 27 (FIG. 1; FIG. 10), attaches from above to a side of the case to open it, thereafter, the case bottom is formed between positions 24 & 25 (FIG. 1, 2) via combined operation of flap folding arms 35, 36, sticking means 39 (FIG. 2) and plate 40 driven by jack 41 (FIG. 3) to effectuate case erection.

Focke et al. disclose conventional means for erecting a case from a blank (FIG. 1) and use of a special lifting conveyor (FIGS. 4-7) traversing accumulation station 20 and top load station 19 (FIG. 1). A lifting head 18 is connected to a toothed belt 22 via arm 34, the belt carrying the lifting head from station to station. Via a lever parallelogram 35, articulators and a horizontally translatable guided carriage 42, the lifting head may ascend and descend at the receiving and loading stations.

Bellante (CAMA1, S.p.A (IT)) discloses a machine characterized by a case forming section, a case loading section, and a loaded case closure/sealing station, the loaded case closing station being fed directly by the box translation system (FIG. 1), for instance by a servo-train conveyor (FIGS. 5 & 6), or a translation system comprising a plurality of linear conveyors independent of each other. The loaded case closing station (FIG. 3) characterized by carriage 301 which translatingly supported on track 302 for movement there along in a process flow direction, the carriage in turn translatingly supporting tool or head 300 on beam 303 for movement there along in a vertical direction (i.e., an ascending/descending motion relative to an underlying loaded case). The tool includes frame 310, an actuatable clamp 312 hingedly supported thereby for closure of front flap 104 of box lid 102 (FIG. 4), and a retainer 316 which works in conjunction with actuatable stop 317 to hold the case for lid/flap closure via the pivot clamp. After lid closure, the case is released and lid flaps 103 are thereafter operated upon by downstream guides (FIG. 9a-9c).

Poutot discloses a machine (FIG. 1) characterized by Selective Compliance Assembly Robot Arms or Selective Compliance Articulated Robot Arms (SCARAB) to effectuate blank transfer (16), case filling (22, 128) and/or case grouping (130) and filling (135), and filled case closure (24). Robotic arm 16 picks a series of adjacent blanks from magazine 14 and urges them into adjacent preforming dies 18 for set up, a feeder removes the partially formed cartons from the pre-former and to carton conveyor 19. An article stream is increasingly adjusted from two lanes via manipulator 12, with gripper heads 54 of a robotic an end of arm tool (EOAT) of carton filling robotic arm 22 (FIG. 4) securing articles for case loading, the EOAT comprising a coupling head 50, a moving head 52 supported thereby, and the gripper heads coupled to the moving head. The moving head is translatable relative to the coupling head (i.e., in the direction of process flow), with the gripper heads capable of moving with respect to each other. Further operational modes contemplate a second loader 128 to supplement the first loader (FIG. 9), or use of a primary grouping device 130 for transfer of cases P to a station for loading into cases C by loader 135 (FIGS. 10 & 11).

Finally, Wintring et al. disclose a top load cartoner wherein blanks are reciprocatingly passed to former robot 22 (FIG. 1) which advances an array of blanks through a gluing station and then to a forming die station 28 wherein the former presses/plunges the blanks onto the forming dies. After overhead loading via conventional means at station 33, the filled cases may have glue applied at station 44 and thereafter pass through fixed guide work for flap folding, with robot 36 vertically passing the loaded cases through static dies for top closure.

With increasing processing demands, for instance and without limitation, higher speed/throughput, greater reliability, improved repeatability, enhanced versatility, reduced downtime (e.g., for maintenance and/or change parts), reduced factory floor space, etc., a platform or modular approach remains advantageous and desirable. While improvements in any of the case set up, case loading or loaded case closure operations are no doubt warmly welcomed, a reimagined machine/processing approach characterized by, among other things, a smaller footprint, an increased operational functionality without increasing overall machine size, fewer parts, especially operator friendly operations/assemblies, operations upon either wrap around or knock down cases, positive case placement and retention throughout all operational steps, a fixedly positioned (e.g., fixed height) case blank magazine, an ability of a case set up assembly to secure cases from either of an in-line magazine or vertical magazine (i.e., cases stacked parallel to the floor), precise operational timing, and effectuation of variable travel paths for supremely efficient and effective operational engagements and selectively sustainable engagements are believed ultimate aims.

SUMMARY OF THE INVENTION

A robotic case packer is provided. The packer, in the form of a system, advantageously, but not necessarily, as a module or platform, includes a case conveying apparatus, a case set up station, a case loading station, and a loaded case closure station, the case conveying apparatus receiving and conveying a case blank for case set up, case loading and loaded case closure operations, a process flow path as to case operations delimited by the case conveying apparatus. The case set up station is characterized by a case set up robot operable in a process flow path direction, the case set up robot securing a case blank from a source of case blanks and transferring the blank to the case conveying apparatus. The case loading station is characterized by a case loading robot operable across the process flow path direction, the case loading robot transferring an article group for case loading into a set up case conveyed by the case conveying apparatus. Finally, the case closure station is characterized by a loaded case closure robot operable in the process flow path direction, the case closure robot effectuating a compressed sealed closure of a loaded case conveyed by the case conveying apparatus.

As to the robots of the contemplated packer, three axis robots advantageously aid case set up and loaded case closure operations, with two axis robots aiding case loading, and suitably aiding case closure operations in lieu of a preferred three axis robot. In a preferred embodiment, the robots are Selective Compliance Assembly Robot Arms or Selective Compliance Articulated Robot Arms (SCARAs). In a further, alternate embodiment, a two axis Cartesian robot may be suitably substituted for the SCARA, e.g., a linear servo driven pusher. Further still, in yet a further alternate embodiment, an additional, second SCARA loaded case closure robot is provided. Notionally, the robots carry tools, i.e., end of arm tools (EOATs) or end effectors.

EOATs may be fixedly carried by the robot, or otherwise carried thereby, for example and without limitation, pivotably or rotatingly carried by/at a free end of the robot. The case up robot is adapted to carry a tool for either of engagement of a knock down case blank or a wrap around case blank, advantageously, a pivotable tool. Moreover, while tools corresponding to each of the case loading and loaded case closure robots may be pivotably or rotatingly carried by/at a free end of the robot, they need not be.

As to case set up, and in a preferred knock down case blank processing embodiment, the case set up robot advantageously, but not necessarily, carries a tool actuatable for cooperative engagement with adjacent portions of such case blank. In a preferred wrap around case blank processing embodiment, the case set up robot advantageously, but not necessarily, pivotably carries a forming die tool characterized by retractable suction cups to secure a case blank from a supply of case blanks. More particularly, the forming die tool includes a frame, a major panel, a minor panel, and retractable vacuum cups to secure the case blank in relation to the major panel of the tool, the panels orthogonally adjacent each other in respect of the frame, the major panel adapted to permit retraction of the vacuum cups there through.

As to case loading, in a preferred embodiment, the case loading robot advantageously, but not necessarily, carries a tool comprising a paddle or the like to sufficiently engaged an article group formed from articles of an article infeed conveyor or the like. The tool engaged article group is thereafter transferred to an adjacent case via robot actuations in furtherance of forming a loaded case.

As to loaded case closure, the case closure robot carries a tool for effectuating a compressed sealed closure of the loaded case conveyed by the conveying apparatus, advantageously, but not necessarily the tool is pivotingly or rotatingly carried thereby. Advantageously, the case closure robot initially animates the tool for travel in a counter process flow path direction to initially engage the loaded case, and thereafter animates the tool for travel in a process flow direction with the loaded case so travelling within the case loading station, and, further still, desirably and optionally, thereafter animating the tool for travel in a process flow direction with the loaded case so travelling through and from the case loading station.

Case blanks for the formation of, without limitation, wrap around cases or knock down cases, are sourced from a magazine, pallet, etc. Advantageously, case blank magazines are contemplated, the magazines preferably but not necessarily being non-indexing types, with in-line and vertical (i.e., flat stack) magazines being equally suitable.

The case conveying apparatus may be of conventional form/design. A conveyor of the apparatus is advantageously a flighted or lugged conveyor, more particularly, either of a flighted or lugged endless belt or chain. Flight adjustability is provided for, with the conveyor adapted for servo driven flight adjustment. Alternately, the case conveying apparatus may take the form of a walking beam conveyor.

In addition to the case conveying apparatus and note operation stations, a preferred robotic case packer is further characterized by a tool bar for effectuating, among other things, case flap manipulations during progressive conveyance of the case blank upon the case conveying apparatus. Advantageously, but not necessarily, the tool bar may include, among other things, flap traps, funnels/ploughs, tuckers, an adhesive dispensing assembly, and a lower loaded case compression assembly/apparatus. Moreover, mechanized elements or components of the tool bar are advantageously readily adjustable, as for instance, via the inclusion of linear actuators as part of a control system or module as to the packer or component. More specific features and advantages obtained in view of the summarized features will become apparent with reference to the drawing figures and DETAILED DESCRIPTION OF THE INVENTION.

BRIEF DESCRIPTION OF THE DRAWINGS

FIGS. 1-12 are provided herewith wherein:

FIG. 1 depicts, side elevation x-y coordinate system, a contemplated, non-limiting robotic case packer system, process flow left to right;

FIG. 2 depicts the system of FIG. 1, overhead plan view x-z coordinate system, process flow left to right;

FIG. 3 depicts system particulars corresponding to area A of FIG. 1;

FIG. 4 depicts system particulars corresponding to area B of FIG. 3, slightly from above, more specifically, select particulars associated with case set up station I;

FIG. 5 depicts system particulars corresponding to area C of FIG. 3, slightly from above, more specifically, select particulars associated with case loading station II and flap tucking station III;

FIG. 6 depicts system particulars corresponding to area C of FIG. 3, slightly from above, more specifically, select particulars associated with loaded case closure station IV;

FIG. 7 depicts, perspective side view slightly from above, an advantageous, non-limiting robotic end of arm tool (EOAT) for facilitating wrap around case set up operations at the case set up station;

FIG. 8 depicts, perspective rear view slightly from above, the wrap around case set up EOAT of FIG. 7;

FIG. 9 depicts transfer of a case blank by a case set up robot, more particularly, a wrap around case blank from an in-line case blank magazine;

FIG. 10 alternately depicts FIG. 9 operations, a wrap around case blank transferred from a vertical case blank magazine;

FIG. 11 depicts transfer of a case blank by a case set up robot, more particularly, a knock down case blank from an in-line case blank magazine; and, FIG. 12 alternately depicts FIG. 11 operations, a knock down case blank transferred from a vertical case blank magazine.

DETAILED DESCRIPTION OF THE INVENTION

A preferred, non-limiting robotic case packer or case packer platform is hereinafter described and shown. Moreover, preferred, non-limiting assemblies, subassemblies, structures and/or mechanisms relating to and for an improved/simplified case packer/case packer platform are generally disclosed and presented throughout the figures of the subject disclosure. In advance of particulars for or with regard to the instant robotic case packer, in all contemplated and/or disclosed forms, some preliminary observations and/or comments as to Applicant's approach to automated case packing are set forth. Moreover, an overview of the structure of the subject disclosure is likewise set forth thereafter.

The instant robotic case packer platform, in any/all of its forms, is intended to be an especially modular and scalable one. For example, a low cost, low speed machine with limited options/functions may be suitably acquired, and, as product life cycle changes, the machine can be readily adapted with minimal changes; packagers may expand their speed/capabilities with added or upgraded modules. The contemplated robots are transmission devices that can be repurposed, with new EOATs designed/replaced at a much lower cost than machine replacement, a departure from heretofore known integrated case packers. Moreover, via advanced mechanisms and/or subassemblies and enhanced motion control, machine usability and uptime are improved, and greater machine speed and payload versatility achieved.

Figure 1:
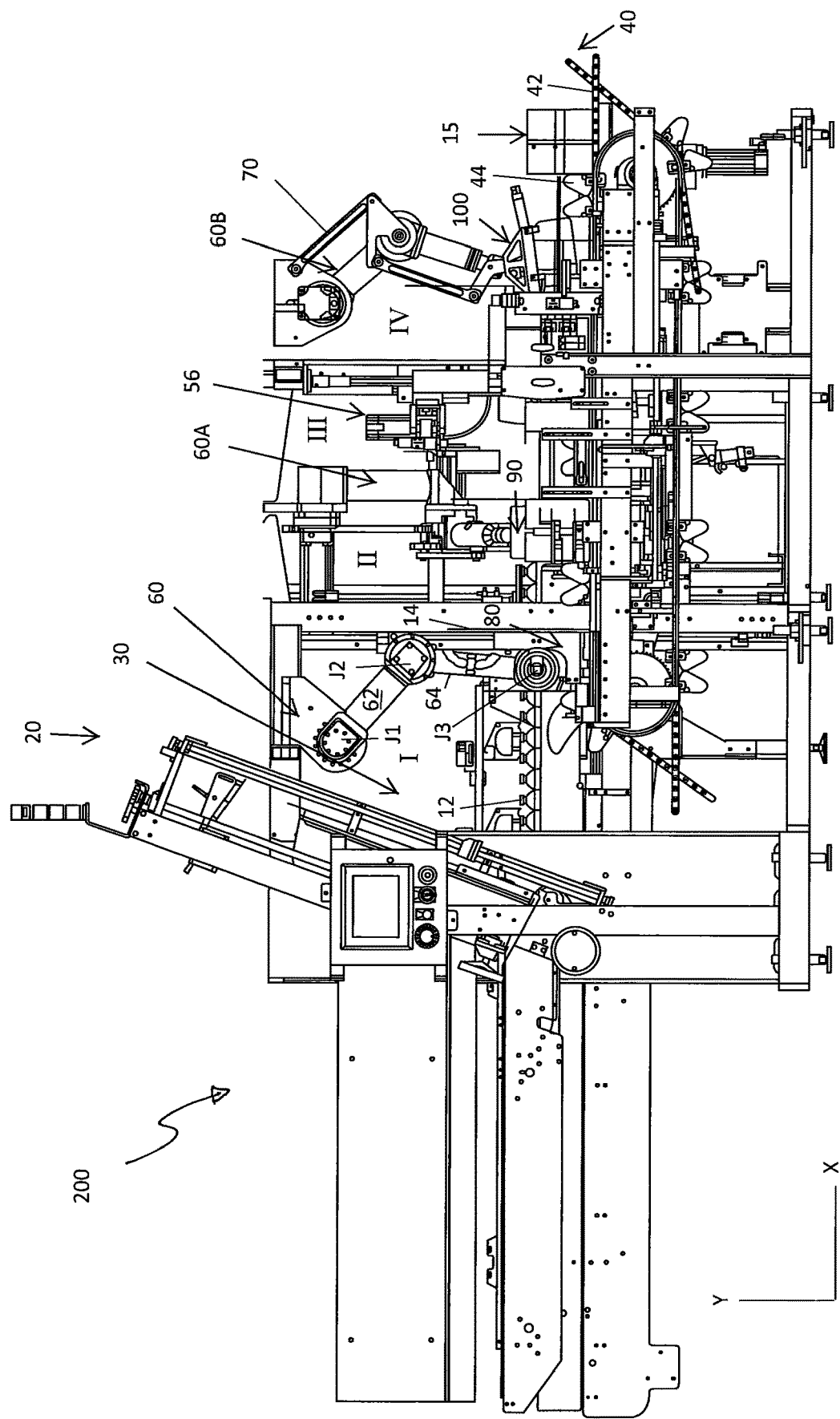
Figure 2:
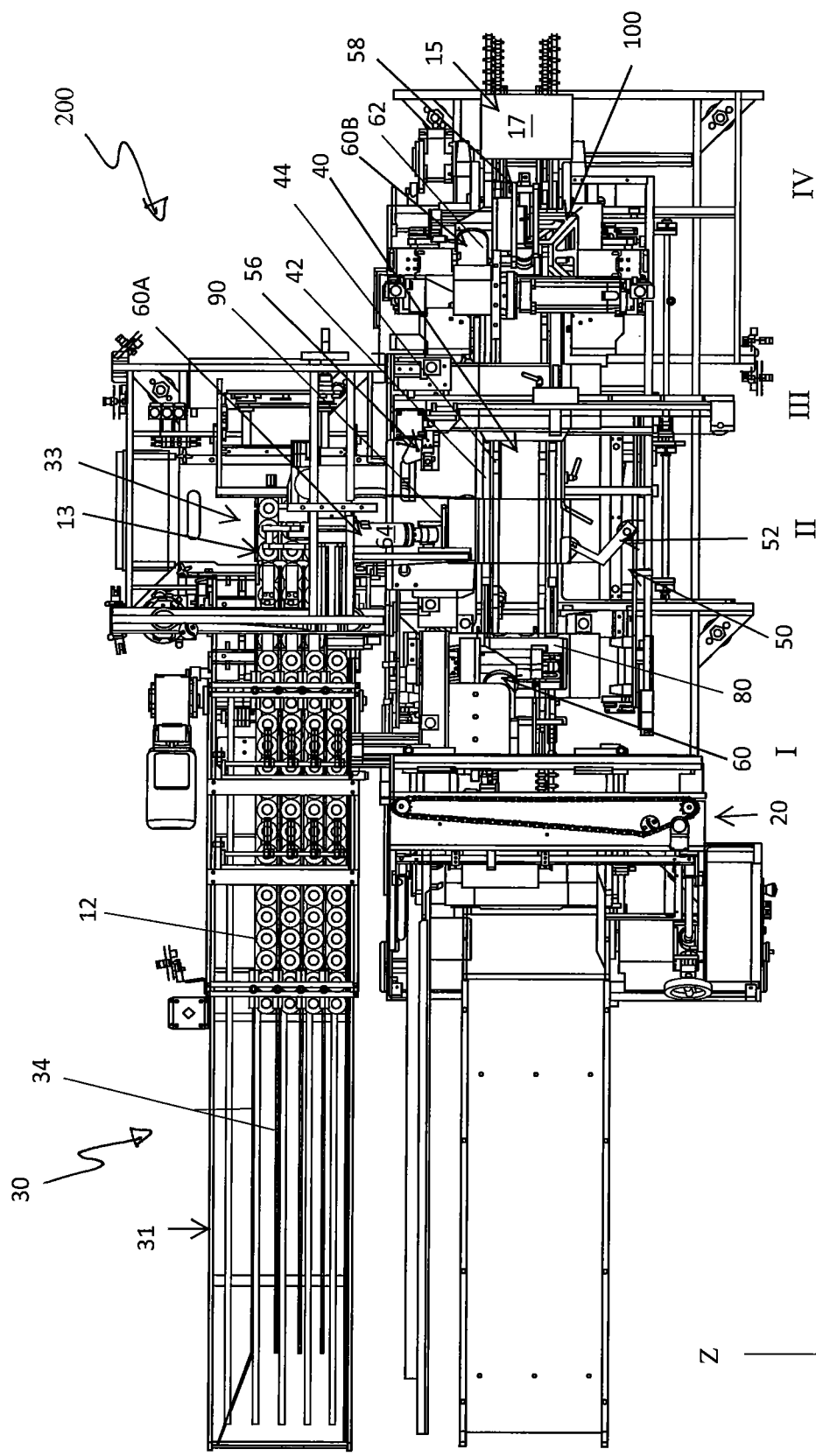
Figure 7:
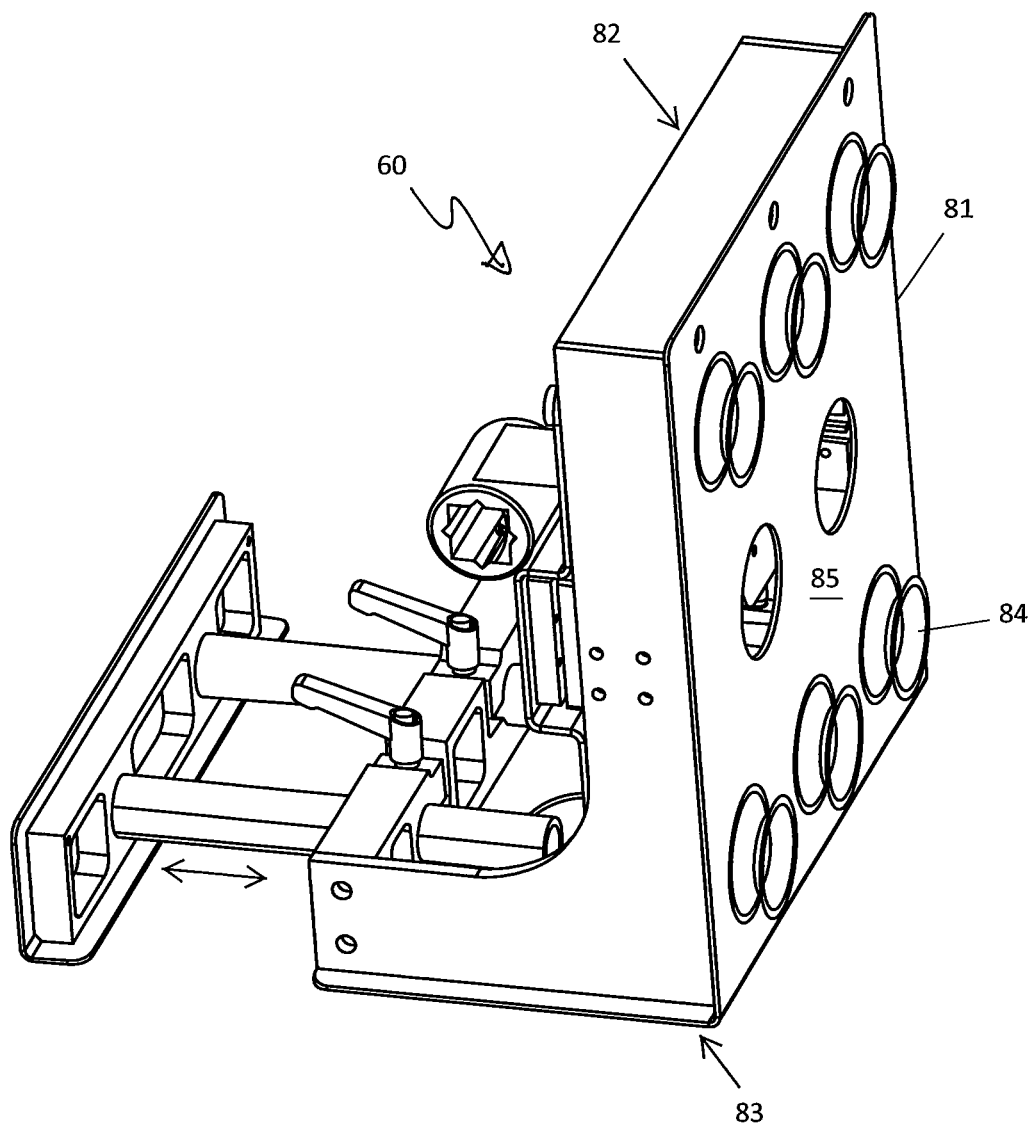
Figure 8:
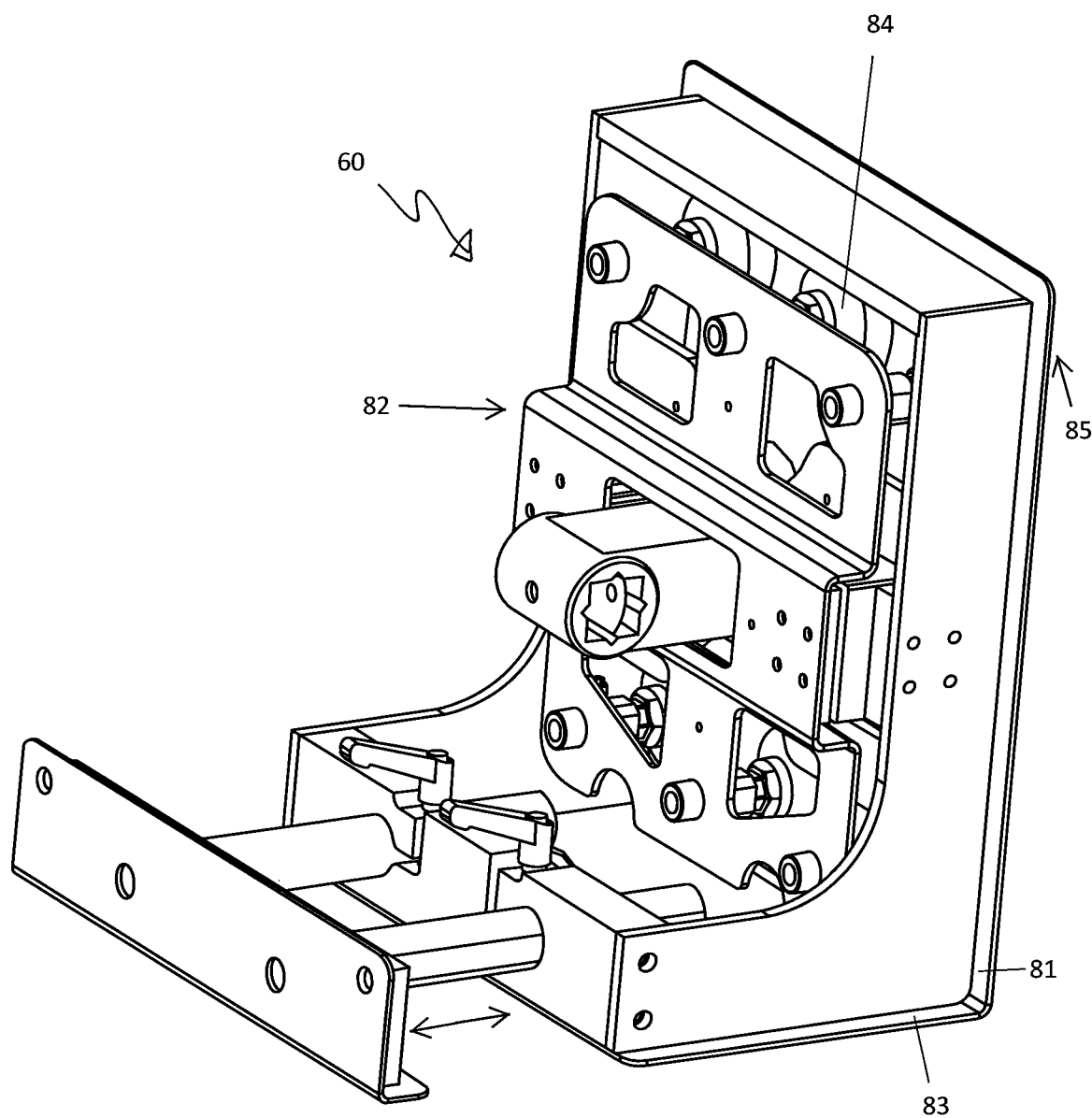
Figure 9:
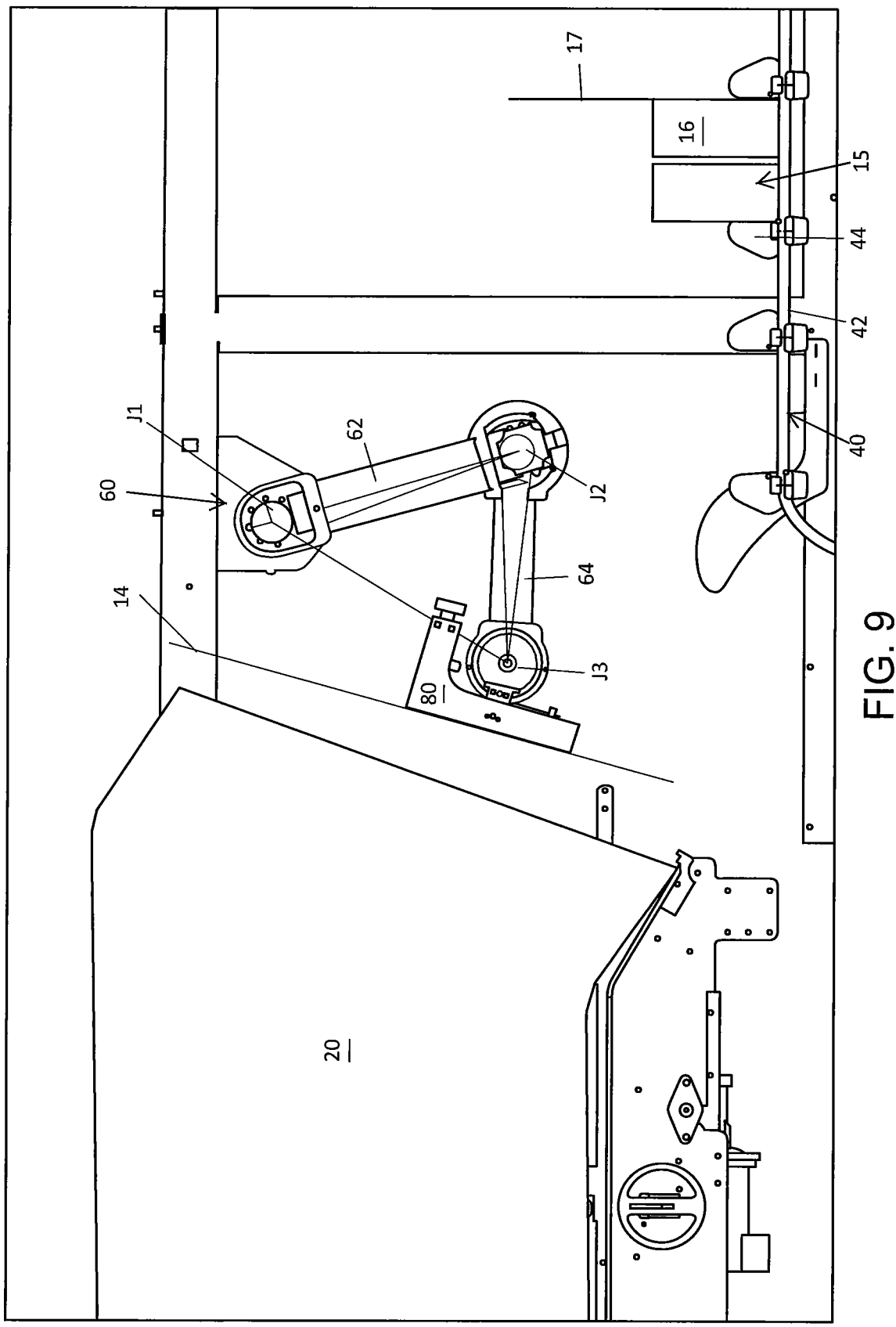

An advantageous case packer platform is depicted in elevation and plan views of FIGS. 1 & 2 respectively, with select platform sections/stations/operations depicted in FIGS. 3-6. An advantageous EOAT for securing a wrap around case and retaining same during case set up operations is depicted in FIGS. 7 & 8, that operation shown in each of FIGS. 9 & 10, case blanks being sourced from in-line and vertical case blank magazines respectively. Finally, the securing and retaining of a knock down case blank, via an alternate EOAT, is depicted FIGS. 11 & 12, case blanks being sourced from in-line and vertical case blank magazines respectively.

With initial reference to FIGS. 1 & 2, there is generally shown a preferred, non-limiting robotic case packer 200, process flow left to right. Characteristic elements of the illustrated case packer platform include a source of case blanks (e.g., a case blank magazine 20 as shown), a source of articles (e.g., an article infeed assembly 30 as shown), a case conveying apparatus 40, a tool bar 50, and a plurality of primary robots (e.g., a case set up robot 60, a case loading robot 60A, and a loaded case closure robot 60B). Notionally, and with additional reference to FIG. 3, the robotic case packer may be fairly categorized by functional units or stations, namely, a case set up station (Station I), a case loading station (Station II), a case flap tucking station (Station III), and a loaded case closing/compression station (Station IV), the Stations sequentially arranged in a process flow direction, Stations I, II & IV characterized by robots 60, 60A, & 60B. In advance of describing and setting forth particulars for the Stations, details are set forth in connection to characteristic elements of the contemplated packer.

Figure 10:
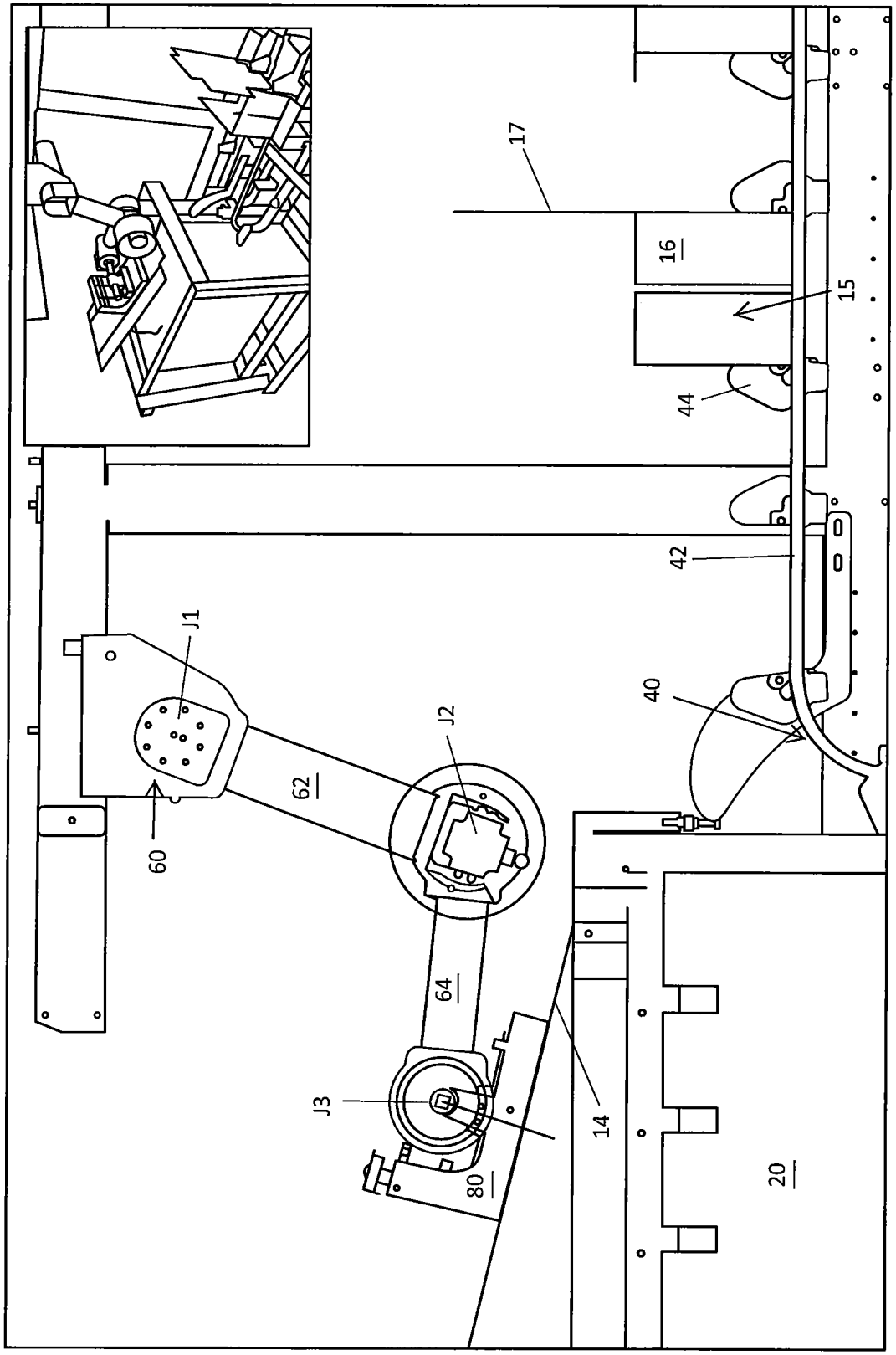
Figure 11:
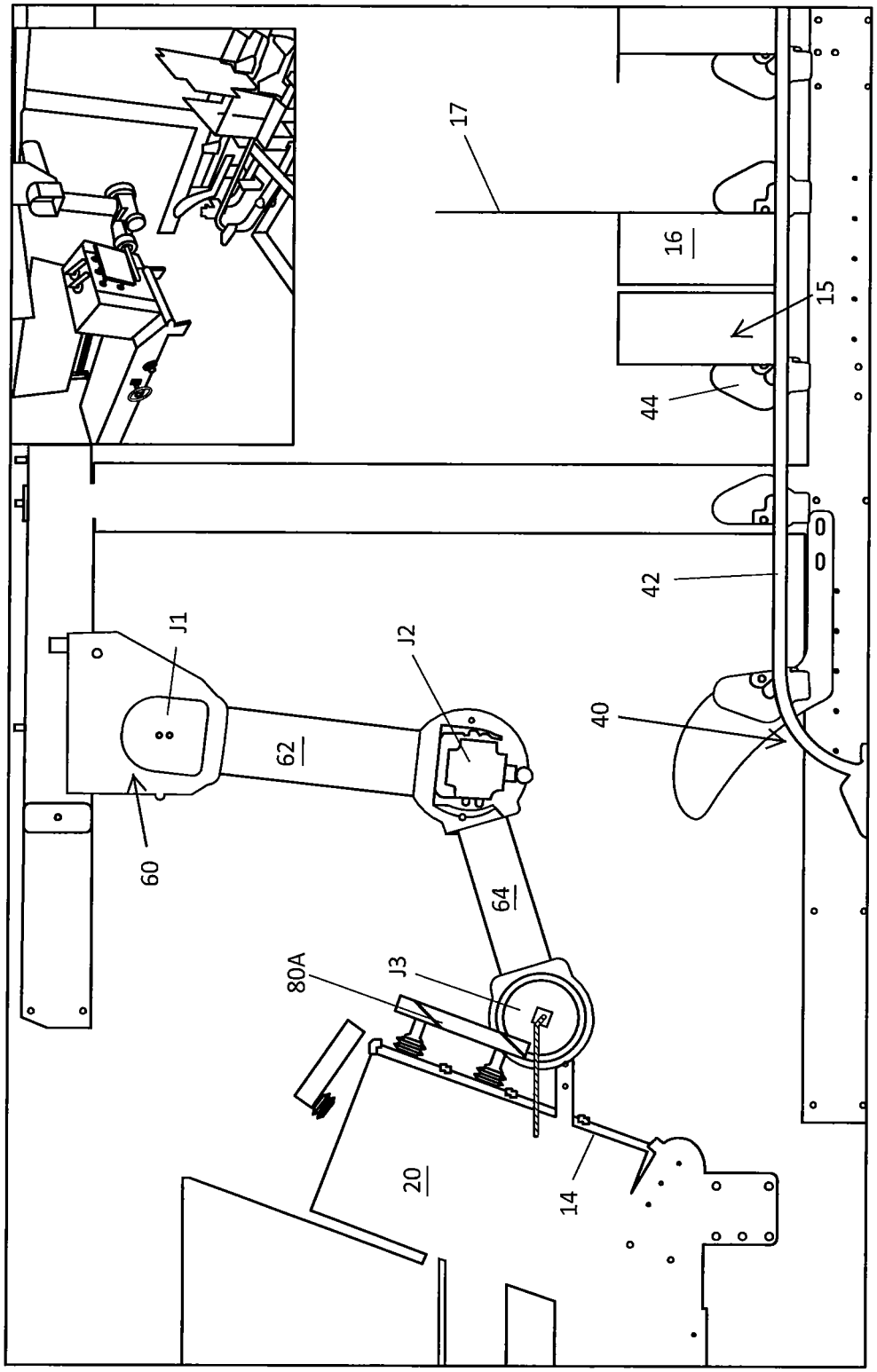
Figure 12:
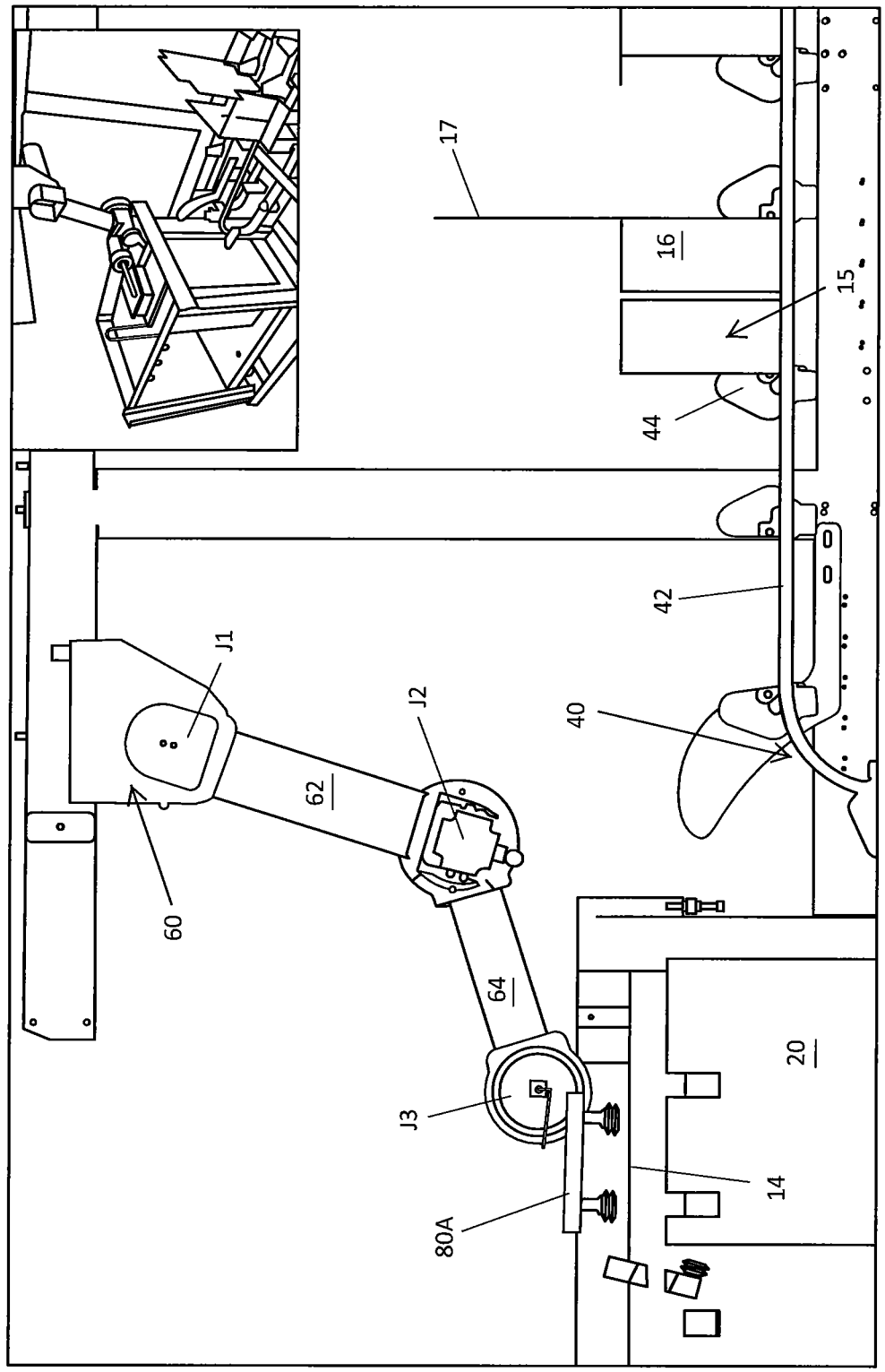

With continued reference to FIGS. 1 & 2, and FIGS. 9 & 11 on one hand and FIGS. 10 & 12 on the other hand, case blank magazines are indicated, namely, in-line (FIGS. 1, 2, 9 & 11) and vertical (FIGS. 10 & 12) case blank magazines wherein case blanks are characterized by each of a relative stand-up posture and flat/flat stack posture respectively. While magazines are indicted, the contemplated robotic case packer need not be so limited, for instance a source of case blanks may suitably comprise palletized case blanks or the like.

While an indexing in-line case blank magazine is believed advantageous, especially an indexing in-line case blank magazine, the contemplated case packer need not be so limited. As will be appreciated in connection to a presentation of Station I particulars, case set up robot 60 and its relative orientation in the packer, and in relation to the source of case blanks, obviates a need of heretofore perceived advantageous use of indexingly advancing case blanks in the magazine of case blanks for downstream presentation of a case blank for selection/manipulation.

With continued reference to FIGS. 1 & 2, article infeed assembly 30 is generally and fairly characterized by an infeed conveyor 32 for advancing articles 12 from an ingress portion 31 to an egress portion 33 thereof, mechanical means, such as lane dividers 34 as shown, for creating and/or maintaining an article array having across the machine and with the machine components (i.e., x-z array components (FIG. 2)), and an article group forming mechanism which operates to essentially create an article group 13 distinguishable from the flowing article array in furtherance of case loading the article group. While the illustrated case packer platform advantageously indicates a spaced apart z parameter space condition (FIG. 2) for the conveyor of the article infeed assembly relative to a portion of the conveyor of the case conveying apparatus, with articles and cases conveyed unidirectionally as to x parameter space (FIG. 2), such arrangement is not intended to be limiting. Conventional infeed assemblies and readily adapted conventional infeed assemblies may be readily substituted or alternately integrated as operational/processing objectives and/or plant plan configurations necessitate.

A case conveyor 42 of case conveying apparatus 40 receives a case blank 14 and transports same for case set up, case loading, case flap tucking, and loaded case closure operations. The case conveying apparatus delimits a process flow path as to case blank/case related operations, namely the serial operations of case set up, case loading, case flap tucking, loaded case closure, and closed loaded case presentation for off-loading.

Advantageously, the case conveyor apparatus is a flighted or lugged case conveyor apparatus, flights 44 carried by conveyor 42 of apparatus 40. The conveyor of the apparatus may suitably take the form of an endless chain or a belt. Preferably, but not necessarily the conveyor of the case conveyor apparatus is a servo driven flighted conveyor, more particularly, a servo driven flighted conveyor adapted for servo driven flight adjustment of flights thereof. Alternately, the case conveyor apparatus is a walking beam conveyor. As case size adjustability, with minimal or no processing downtime, is believed desirable, all contemplated case conveyance scenarios advantageously, but not necessarily, include flight adjustability. Moreover, in furtherance of processing cases characterized by cases having a greater degree of variable widths, a flight chain having inner, outer and intermediate chain elements wherein flights of the intermediate chain are adapted so as to be readily removable is further contemplated.

Figure 3:
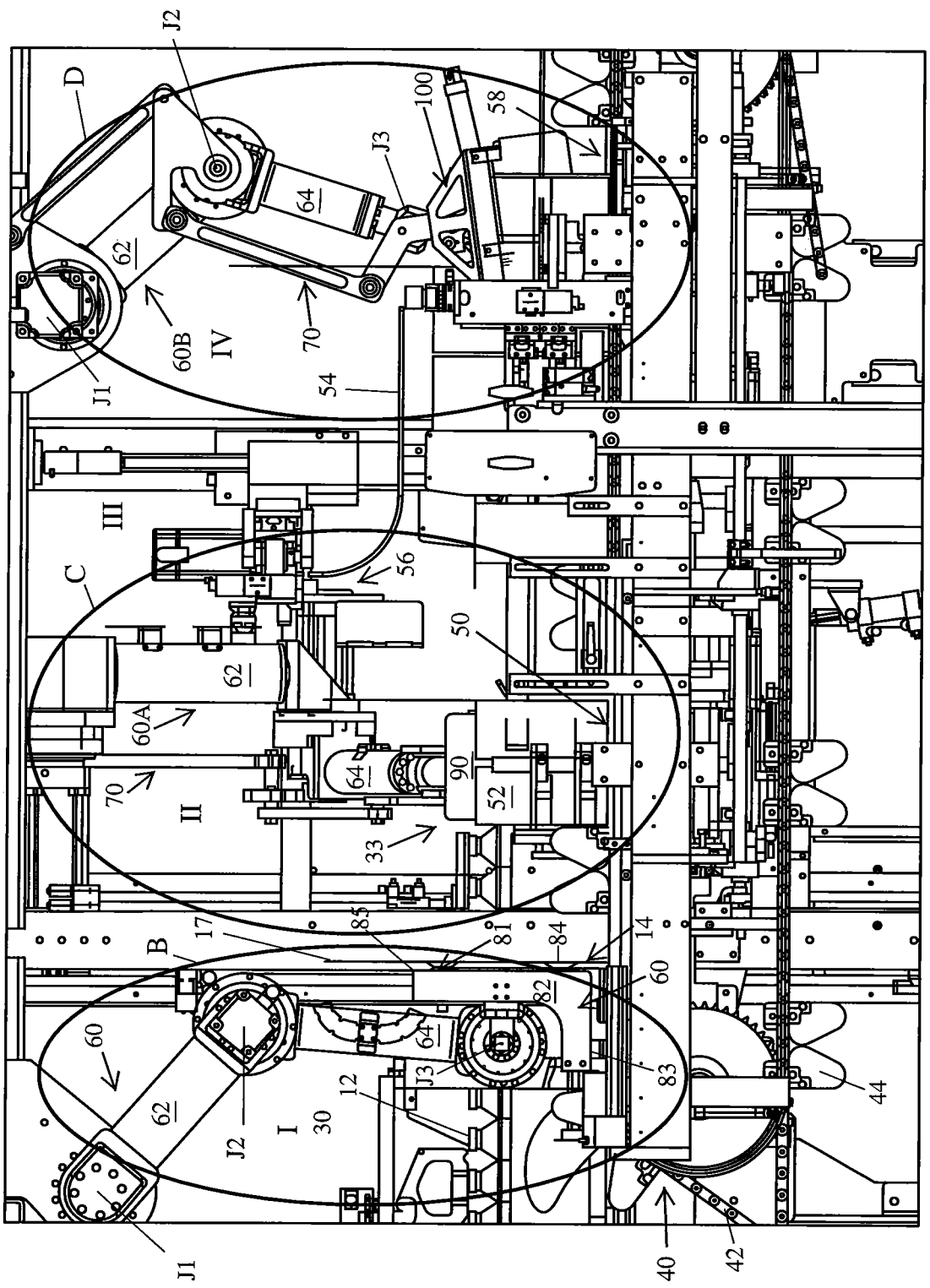
Figure 4:
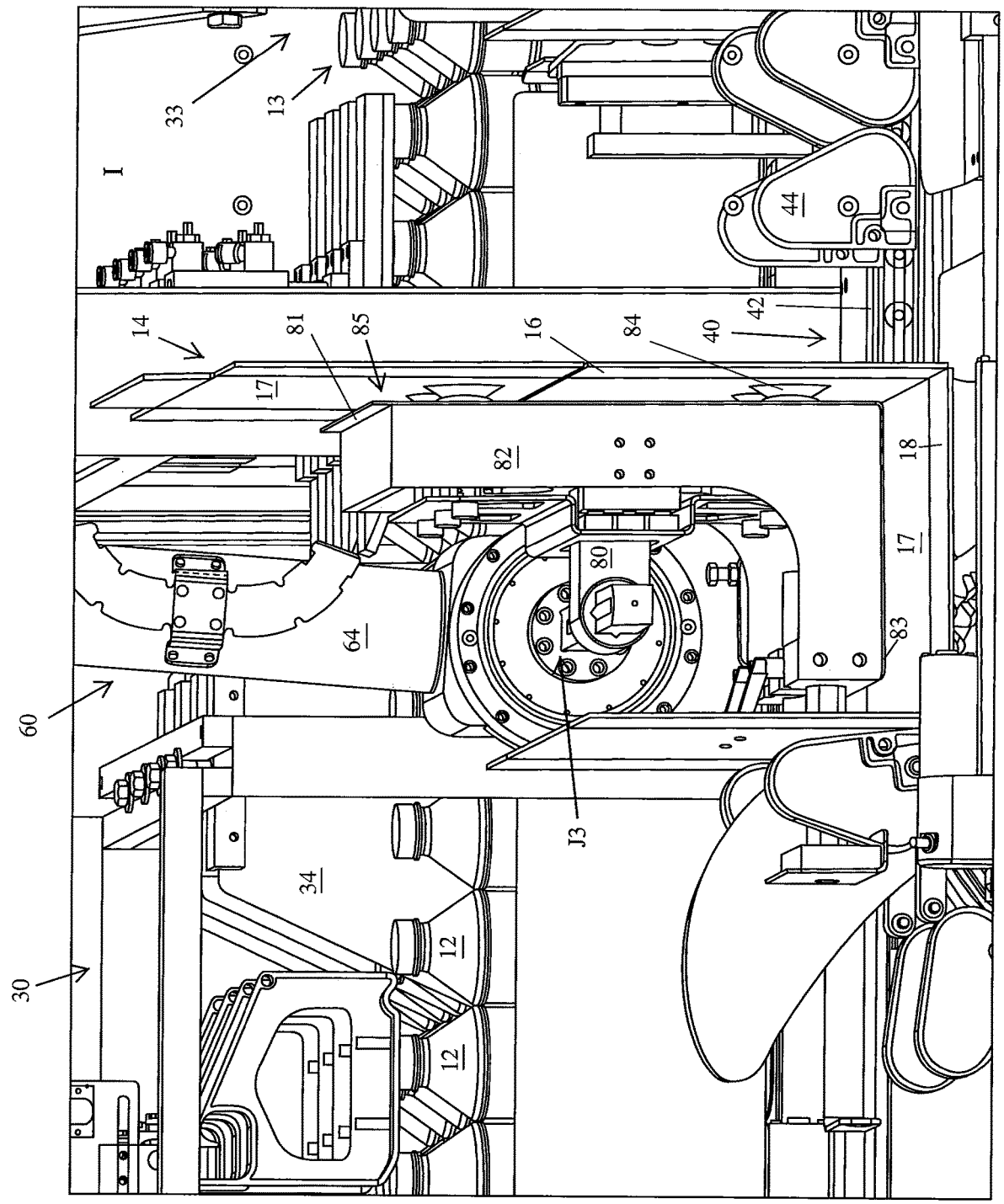
Figure 5:
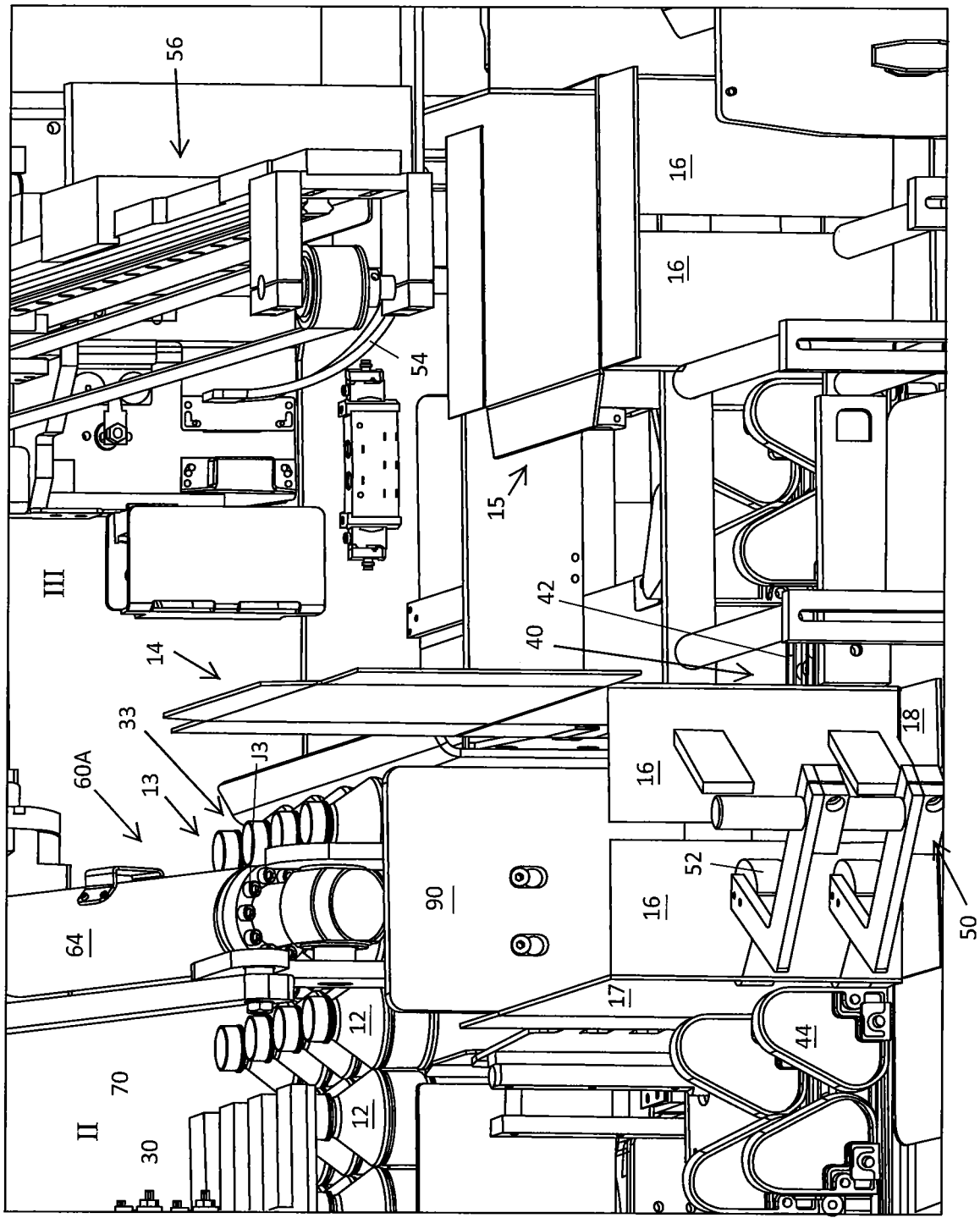
Figure 6:
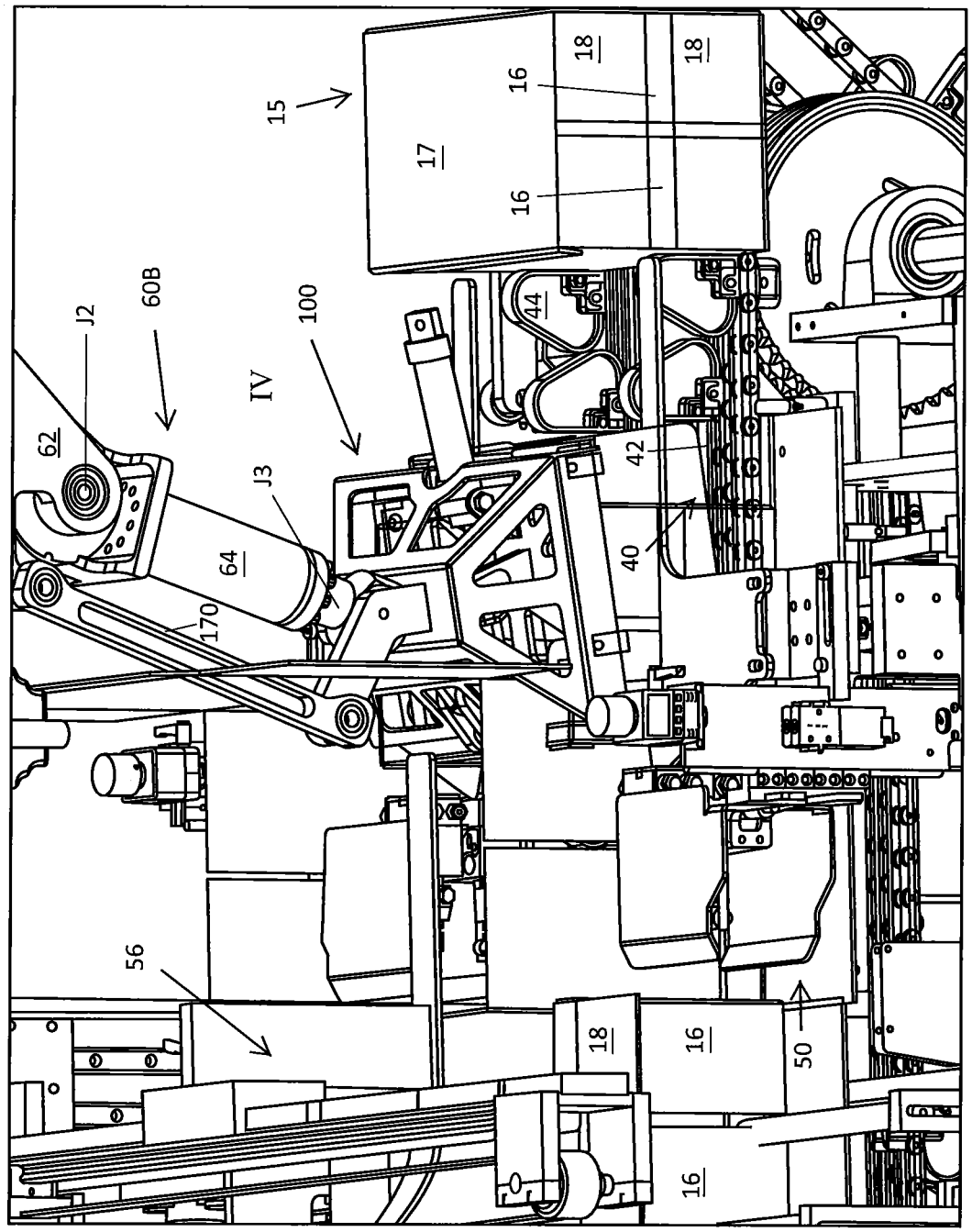

With continued general reference to FIGS. 1 & 2 and specific reference to FIG. 3, tool bar 50 comprises functional elements (i.e., components) that ready or advantageously prepare the traveling case for operations at one or more of Stations I-IV. Elements of the tool bar may be mechanized or static with advantageous tool bars characterized by a combination thereof, elements generally but not necessarily including, and not limited to, flap traps, funnels/ploughs, tuckers, an adhesive dispensing assembly, and a lower loaded case compression assembly/apparatus. Preferably, but not necessarily, select tool bar components utilize linear actuators to effectuate automatic adjustment, with a modular design allowing for simple pneumatics, servo pneumatics and servo motor actuation within a given working envelope associated with the targeted function based upon, for instance, processing speed/throughput, product processing (i.e., articles and/or cases styles and/or sizes/dimensions), and customer preference.

Essentially, case flap manipulations are executed by functional elements of or associated with the tool bar. As appreciated with reference to FIG. 3, case major (vertically extending) flaps 16 of case 15 are sequentially tucked in Station II, via an upstream tucker 52 and downstream guide 54, a case panel 17 (i.e., upper opposite lugged case panel) is pivotingly deflected from a generally vertical orientation by a further guide 54*a* in anticipation of adhesive application at Station III via an adhesive dispensing assembly 56, with minor (horizontally extending) lower case flaps 18 of case 15 thereafter guidingly positioned to overly the tucked major flaps with lower loaded case compression effectuated via a loaded case lower compression assembly 58 for operation upon the lower lugged portion of the loaded case.

Having set forth particulars and preferred non-limiting particulars for arguably ancillary elements of the instant robotic case packer, attention is now directed to the primary functional operations/units thereof. Case set up, case loading and loaded case closure operations are effectuated by a plurality of robots, namely, case set up robot 60, case loading robot 60A, and loaded case closure robot 60B, each robot associated with or corresponding to packer Stations I, II & IV respectively.

Case set up station (Station I) is characterized by a case set up robot operable in a process flow path direction, the case set up robot securing a case blank from a source of case blanks and transferring the blank to the case conveying apparatus. Case loading station (Station II) is characterized by a case loading robot operable across the process flow path direction, the case loading robot transferring an article group for case loading into a set up case conveyed by the case conveying apparatus. The case closure station (Station IV) characterized by a case closure robot operable in the process flow path direction, the case closure robot effectuating a compressed sealed closure of a loaded case conveyed by the case conveying apparatus.

In advance of a presentation of illustrated particulars, some observations are warranted as to the robots of the contemplated robotic case packer and their interrelationships and relationships to other packer elements. While, as will be subsequently taken up, Selective Compliance Assembly Robot Arms or Selective Compliance Articulated Robot Arms (SCARAs) are part-and-parcel of an especially advantageous, non-limiting robotic case packer, alternate robots are contemplated and/or suitably utilized or adapted for use in a manner not inconsistent with the disclosed processing approach.

Contemplated robots are a combination of two and three axis robots. More particularly, the case set up robot comprises a three axis robot, the case loading robot comprises a two axis robot, and the case closure robot comprises a two or three axis robot. While a single robot to effectuate the desired operation yields processing enhancements, a further (i.e., second) loaded case closure robot may yield further processing enhancements.

Advantageously, each of the case set up robot, the case loading robot, and the case closure robot comprises a SCARA robot, the case loading robot suitably comprising a two axis Cartesian robot, advantageously in the form of a linear servo drive assembly for effectuating a reversible linear motion for a loading tool, e.g., a pusher the like for transferring an article group in an across the machine direction (i.e., z parameter space as per FIG. 2) into a partially formed case being conveyed by the case conveying apparatus. Via the contemplated sequential SCARA configuration, orientation of each SCARA relative to the process flow path (i.e., set up and loaded case closure SCARAs operating with the process flow path (x parameter space) and case loading across the process flow path (z parameter space), and possible SCARA articulations, operational dwell or processing time in respect of case set up and loaded case closure is increased without resort to a greater or increased processing line length. Moreover, in addition to compactness in the process flow direction, advantageous reductions are likewise made in respect of the depth and height dimensions of the contemplated robotic case packer, thus a minimal supremely efficient working volume for the entirety of case packing operations results.

With renewed reference to FIGS. 1-3, each operational station is advantageously characterized by a SCARA, SCARAs 60,60A & 60B selectively equipped with an EOAT, 80, 90 & 100 respectively. In keeping with Applicant's prior teaching, namely, WO 2017/041007 (PCT/US2016/050222) entitled Improved Robotic Article Handling System & Operations, incorporated herein by reference in its entirety, each SCARA includes first (upper) 62 and second (lower) 64 arm segments, and three arm joints J1, J2, & J3. A first arm joint (J1) is a terminal/anchorable arm joint (i.e., the robotic arm depends from J1). A second arm joint (J2) is an intermediate arm joint. A third arm joint (J3) is a distal or free-end arm joint which operatively supports the EOAT.

Absent adaptation, the SCARAs operate in a single plane, i.e., two dimensions, with two or three axis functionality as subsequently noted. Rotation of the SCARA at J1, and/or rotation about a J4 axis to permit a further degree of freedom for the EOAT are known and believed advantageous as operational outcomes warrant. Moreover, advantageously, but not necessarily, the SCARAB of Station II and Station III are adapted so as to include a linkage 70 for control of the EOAT, see e.g., Applicant's copending application Ser. No.

16/015,751 filed 22 Jun. 2018 and entitled Robotic Article Collation Metering Assembly, incorporated herein by reference in its entirety.

In connection to Station I (FIG. 4), SCARA 60, operating in the x-y plane, is advantageously configured for three axis motions, and includes (i.e., is equipped with) an EOAT comprised of a forming die 80 (see especially FIGS. 7 & 8) for acquiring and setting up a wrap around case. As noted, wrap around case set up from blanks of a vertical magazine are likewise contemplated (FIG. 10). It is to be further noted that the Station I SCARA could readily automate other adjustment functions, such as, but hardly limited to, flight chain index length and EOAT change/storage.

Forming die tool 80 is fairly characterized by a frame 82 (i.e., a structural member or assembly) which supports major 81 and minor 82 panels, the panels orthogonally adjacent each other and generally corresponding to major/minor panels of the case (i.e., sidewall portions thereof). Forming die 80 is further characterized by vacuum cups 84 or the like, cups 84 retractable within frame 82 (i.e., so as to be flush or in a recessed condition in relation to a surface 85 of major panel 81) from a case blank engaging posture proud of the major panel surface 85 (FIG. 7), in furtherance of effectuating a reliable, precise, unaltered, position/positioning of the case upon the case conveyor as the forming die releases the lugged case and commences renewed travel toward the magazine. As should be readily appreciated with reference to FIG. 9, the wrap around case, via the rotation of the forming die at J1 of SCARA 80, is rotated commensurately, the exterior affixation surface of the case in the magazine posture becomes an interior case surface in the case conveyor during SCARA animation.

In connection to knock down case processing, the SCARA is readily equippable with an alternate EOAT, namely, a knock down case set up tool 80A as notionally illustrated FIGS. 11 & 12. Particulars of a representative, non-limiting EOAT 80A for knock down case erection are set forth in Applicant's copending application Ser. No. 15/927,588 filed 21 Mar. 2018 and entitled Robotic Case Erector, especially FIGS. 2 & 4 thereof, see also https://www.insitepackaging.com, each referenced teaching incorporated herein by reference in its entirety, with adaptations relative to the instant platform based modular case packing operation as may be warranted. Such forming tool efficiently and effectively performs Station I functions.

In connection to Station II (FIG. B5), SCARA 60A, operating in the y-z plane, is advantageously but not necessarily configured/adapted for two axis motion, and includes (i.e., is equipped with) an EOAT comprised of a paddle 90 or the like for engaging a downstream most article or product group. Select SCARA 60A motions effectuate an across the machine translation of the target article group in furtherance of loading the adjacently positioned partially erect case.

In connection to Station IV (FIG. 6), SCARA 60B, operating in the x-y plane, is advantageously, but not necessarily, configured/adapted for two axis motion, and includes (i.e., is equipped with) an EOAT comprised of an upper compression assembly 100 for engaging a loaded wrap around case in furtherance of securing the articles relative to the case. In addition to a single operative combination of the SCARA and EOAT at Station IV, a further operative combination is contemplated, so as to result in dual operative loaded case closure/closure sealing mechanisms, and believed advantageous for, among other things, increased throughput. Particulars of and for contemplated EOAT 100 are disclosed/shown in a filing of Applicant Douglas Machine Inc. of Alexandria, Minn. USA, more particularly U.S. patent application Ser. No. 16/593,505 filed on Oct. 4, 2019, as the instant application and now U.S. Pat. No. 11,292,624, and entitled end of arm tool for loaded case closure/sealing, the entirety of which is incorporated herein by reference.

The compression EOAT is animated by its SCARA so as to be advanced toward the loaded case presented and positioned with Station IV for squaring and closure, closure/sealing operations, the SCARA enabling optimization of the flight chain transfer line. The SCARA can reach up stream of itself, and begin to form the package as it exactly matches the case movement into the compression station. Additionally, the SCARA can operate on the case while in the compression station where additional flap manipulation occurs. Lastly, the SCARA may advantageously maintain flap control of the case as the case is moved out of or from the compression station. The ability to extend the compression operation into and out of the compression station lengthens compression time as well as the ability to change the flight operation from one of indexing to one of continuous operation.

Further contemplated Station IV operations are contemplated and believed advantageous. For example, and without limitation, via SCARA adaptation for inclusion of a J4 axis, either or both sealed case rotation or case up ending at a processing discharge local is enabled. Moreover, suitable adaptations are contemplated to effectuate overlapping lower and upper loaded case compression plates, more particularly, having upper compression plates overlap with lower compression plate(s) so as to permit retraction of the lower plate and yielding to the upper for suitable closure/sealing.

What has been described and depicted herein are preferred, non-limiting embodiments of Applicant's subject matter, along with one or more application contexts. Since the structures of the assemblies, subassemblies, and/or mechanisms disclosed herein may be embodied in other specific forms without departing from the spirit or general characteristics thereof, some of which forms have been indicated, the embodiments described and depicted herein/with are to be considered in all respects illustrative and not restrictive. Moreover, while nominal processing has be described and detailed, and to some degree alternate work pieces and systems, assemblies, etc. with regard thereto referenced, contemplated system and/or processes are not so limited. Accordingly, the scope of the subject invention is as defined in the language of the appended claims, and includes not insubstantial equivalents thereto.

That which is claimed:

1. A robotic case packer machine for securing product groups in cases comprising:
   a structural frame assembly;
   a single conveyor for receipt of a case blank, said single conveyor characterized by a case set up station, a case loading station and a loaded case closure station, said stations sequentially arranged along a process flow path delimited by a direction of conveyance associated with said single conveyor, wherein case set up, case loading and loaded case closure operations are executed along the process flow path;
   a case set up robot associated with said case set up station, said case set up robot operable reversibly along the process flow path for securing a case blank from a source of case blanks and placing the secured case blank upon said single conveyor, said case set up robot equipped with a pivotable tool to effectuate securing and placing the case blank, wherein said pivotable tool comprises an arm equipped with vacuum cups;

a case loading robot associated with said case loading station, said case loading robot operable reversibly across the process flow path for a non-lifted transferring of a product group for case loading into a set up case conveyed by said single conveyor;

a loaded case closure robot associated with said case closure station, said loaded case closure robot operable reversibly along the process flow path, said loaded case closure robot equipped with a tool to effectuate an overhead compressed closure of a loaded case conveyed by said single conveyor so as to secure the product group within the case, wherein said tool comprises a loaded case flap folding assembly comprising a second actuator and flap engaging elements, a loaded case squaring assembly comprising a first actuator, and a frame for supporting the flap folding and case squaring assemblies, wherein the loaded case squaring assembly is configured to be actuated by the first actuator to engage a first side of the loaded case prior to the case flap folding assembly being actuated by second actuator to engage the first side of the loaded case; and wherein said single conveyor is positioned within said structural frame assembly so as to traverse a length thereof, and wherein each of the case set up robot, the case loading robot, and the loaded case closure robot are mounted to the structural frame assembly, the loading and closure robots mounted at a position vertically above the single conveyor, each of the case set up robot, the case loading robot, and the loaded case closure robot configured as a two or three axis robot.

2. The robotic case packer of claim 1 wherein said case set up robot comprises a SCARA robot.

3. The robotic case packer of claim 1 wherein said case loading robot comprises a SCARA robot.

4. The robotic case packer of claim 1 wherein said case closure robot comprises a SCARA robot.

5. The robotic case packer of claim 1 wherein each of said case set up robot, case loading robot and said loaded case closure robot comprises a SCARA robot.

6. The robotic case packer of claim 1 wherein said case loading robot comprises a two axis Cartesian robot.

7. The robotic case packer of claim 1 wherein said case loading robot is characterized by a linear servo driven pusher.

8. The robotic case packer of claim 1 wherein said case closure robot pivotingly carries the tool for effectuating the overhead compressed closure of the loaded case conveyed by said single conveyor.

9. The robotic case packer of claim 1 wherein said case closure robot rotatingly carries the tool for effectuating the compressed sealed closure of the loaded case conveyed by said single conveyor.

10. The robotic case packer of claim 1 wherein said case closure robot initially animates said tool for travel in a counter process flow path direction to initially engage the loaded case and thereafter animates said tool for travel in a process flow direction with the loaded case so travelling within said case loading station.

11. The robotic case packer of claim 1 wherein said case closure robot initially animates said tool for travel in a counter process flow path direction to initially engage the loaded case and thereafter animates said tool for travel in a process flow direction with the loaded case so travelling through and from said case loading station.

12. The robotic case packer of claim 1 wherein said single conveyor comprises a flighted conveyor.

13. The robotic case packer of claim 1 wherein said single conveyor comprises a servo driven flighted conveyor adapted for servo driven flight adjustment of flights of said servo driven flighted conveyor.

14. The robotic case packer of claim 1 wherein said single conveyor comprises a flighted chain conveyor.

15. The robotic case packer of claim 1 wherein said single conveyor comprises a flighted belt conveyor.

16. The robotic case packer of claim 1 wherein said single conveyor comprises a walking beam conveyor.

17. The robotic case packer of claim 1 further comprising a case blank magazine from which case blanks are sourced.

18. The robotic case packer of claim 1 further comprising an in-line case blank magazine from which case blanks are sourced.

19. The robotic case packer of claim 1 further comprising an indexing in-line case blank magazine from which case blanks are sourced.

20. The robotic case packer of claim 1 further comprising a vertical case blank magazine from which case blanks are sourced.

21. The robotic case packer of claim 1 further comprising a non-indexing vertical case blank magazine from which case blanks are sourced.

22. The robotic case packer of claim 1 further comprising a vertical case blank magazine from which case blanks are sourced, case blanks of said vertical case blank magazine automatingly received thereby.

23. The robotic case packer of claim 1 further comprising a tool bar for effectuating case flap manipulations during progressive conveyance of the case blank upon said single conveyor.

24. The robotic case packer of claim 23 wherein said tool bar comprises one or more of flap traps, funnels or tuckers.

25. The robotic case packer of claim 23 wherein said tool bar comprises one or more of flap traps, funnels or tuckers, select ones of said one or more of said flap traps, funnels or tuckers utilizing linear actuators to effectuate adjustment.

26. The robotic case packer of claim 23 wherein said tool bar comprises one or more of flap traps, funnels or tuckers, said one or more of said flap traps, funnels or tuckers utilizing linear actuators to effectuate adjustment.

27. The robotic case packer of claim 23 wherein said tool bar comprises an adhesive dispensing assembly for dispensing adhesive in furtherance of the loaded case closure operation.

28. The robotic case packer of claim 23 wherein said tool bar comprises a loaded case compression assembly for operation upon a portion of a loaded case retained by said single conveyor at said loaded case closure station.

* * * * *